Dec. 16, 1924.
J. W. NORRIS
BRAKE CONSTRUCTION FOR MOTOR VEHICLES
Filed Sept. 10, 1923
1,519,467
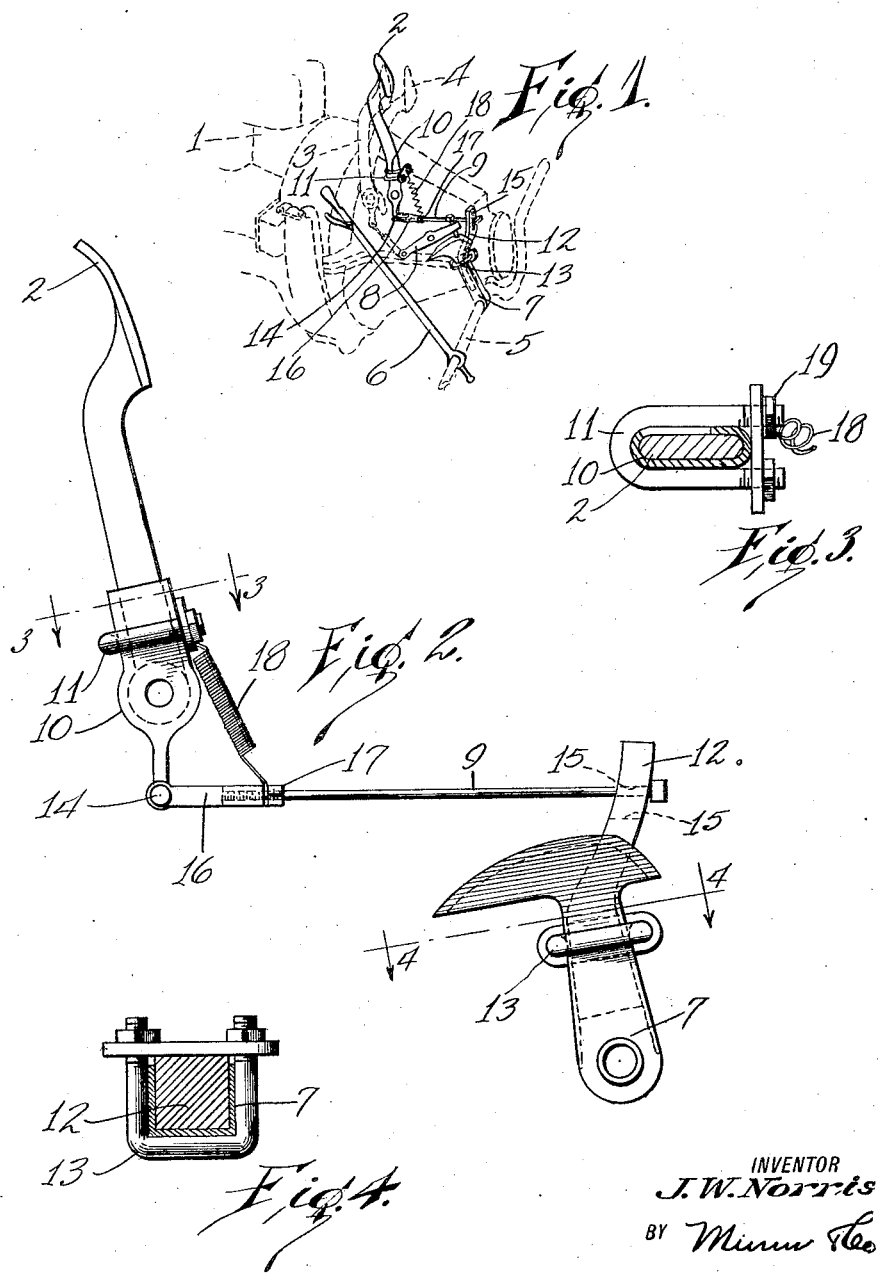
INVENTOR
J. W. Norris
BY
ATTORNEYS Patented Dec. 16, 1924.

1,519,467

UNITED STATES PATENT OFFICE.

JOHN WILLIAM NORRIS, OF KIMBALL, NEBRASKA.

BRAKE CONSTRUCTION FOR MOTOR VEHICLES.

Application filed September 10, 1923. Serial No. 661,944.

*To all whom it may concern:*

Be it known that I, JOHN WILLIAM NORRIS, a citizen of the United States, and a resident of Kimball, in the county of Kimball and State of Nebraska, have invented a new and useful Improvement in Brake Constructions for Motor Vehicles, of which the following is a full, clear, and exact description.

My invention relates to improvements in brake constructions for motor vehicles, and it consists in the combinations, constructions, and arrangements herein described and claimed.

An object of my invention is to provide a brake construction for motor vehicles of that type in which the brake band is applied to one part of the planetary transmission when the foot brake is actuated, this brake construction consisting of novel means for connecting the emergency lever of the vehicle with the brake pedal, whereby the brake band of the planetary transmission will be actuated when the emergency lever is actuated, thus making it unnecessary to provide a brake band on the rear wheels of the vehicle.

A further object of my invention is to provide a device of the character described which is very simple in construction and which may be readily attached to the vehicle with but slight alterations being necessary in the latter.

Other objects and advantages will appear in the following specification, and the novel features of the invention will be particularly pointed out in the appended claim.

My invention is illustrated in the accompanying drawings, forming part of this application, in which—

Figure 1 is a perspective view of an engine which employs the planetary transmission, showing my device operatively applied thereto, Figure 2 is a side elevation of the device, Figure 3 is a section along the line 3—3 of Figure 2, and Figure 4 is a section along the line 4—4 of Figure 2.

In carrying out my invention, I make use of an engine, indicated generally at 1, which is provided with the usual brake pedal 2, clutch pedal 3, and reverse pedal 4. In Figure 1 I have also shown a rod 5 to which the emergency lever 6 is secured. The emergency lever is normally connected by a means (not shown) with the brake band on the rear wheels of the car. A speed lever 7 is also secured to the rod 5 and is adapted to actuate the clutch lever 8 so as to throw the engine in neutral when the emergency lever is actuated. The parts heretofore described are ordinary in construction and form no part of my invention except in so far as they cooperate with the parts about to be described.

In the present form of the device I have discarded the brake on the rear wheels and the connections between the emergency lever and the brake. In the present form of the device the emergency lever 6 is connected to the brake pedal 2 by means of a rod 9 (see Figure 2). A casting 10 is secured to the brake pedal 2 by means of a U-bolt 11. The speed lever 7 also has a casting 12 secured thereto by a U-bolt 13. The rod 9 is threaded into a yoke 16 which in turn is pivotally secured to the casting 10 at 14. The other end of the rod 9 is slidably received within a slot 15 in the casting 12. The rod 9 is adapted to be lengthened or shortened by merely turing the rod in the yoke 16. The lock nut 17 secures the rod in adjusted position. The lock nut 17 also holds one end of a spring 18 to the rod 9, the other end of the spring being secured to the U-bolt 11 by means of one of the nuts 19 of the bolt.

From the foregoing description of the various parts of the device, the operation thereof may be readily understood. In operation, it is customary to use the brake pedal 2 when slowing up the car and to use the emergency lever 6 when bringing the car to an abrupt stop. I have found that by connecting the lever 6 with the brake pedal 2, the emergency brake band can be done away with. In this manner the brake band in the planetary transmission is actuated when the brake pedal 2 is moved or the lever 6 is moved.

The brake pedal 2 can be used in the ordinary manner, since it will be noted that when the pedal is actuated, the rod 9 merely slides within the slot 15 and does not actuate the speed lever 7. The spring 18 yieldingly holds the rod 9 against the upper side of the slot 15 so as to prevent rattling of the rod while the car is in motion.

When it is desired to stop the car, and at the same same time to throw the engine into neutral position, the lever 6 can be actuated in the ordinary manner. The lever instead of tightening the brake band about the rear wheels of the car, will swing the speed lever 7 so as to cause the clutch lever to thrown the clutch pedal into neutral position and to swing the casting 12 so as to move the rod 9 and the brake pedal 2, the movement of the brake pedal applying the brake in the planetary transmission. The car functions in exactly the same manner as when the device is not applied thereto, except that the brake band in the planetary transmission is actuated each time the brake pedal 2 or the emergency lever 6 is actuated. It will therefore be apparent that I have eliminated the emergency brake band from the rear wheels and the connections thereto and instead employ but one brake band for both the pedal and the lever. The device is positive in operation and can be readily applied to any car in which the planetary transmission is employed.

I claim:

The combination with an automobile having a brake pedal, a shaft, an emergency lever secured to said shaft, and a speed lever secured to said shaft, of an arm having a slot therein and rigidly secured to said speed lever, a link operatively connected to said brake pedal and having its free end slidably disposed in said slot, said link having a head adapted to engage with said arm when said emergency lever is actuated, and spring means for holding said link against the top of said slot.

JOHN WILLIAM NORRIS.